United States Patent
Cuffney et al.

(10) Patent No.: US 12,547,408 B2
(45) Date of Patent: Feb. 10, 2026

(54) MULTI-LEVEL PHT ENTRY SWAPS BASED ON FIRST LEVEL MISS AND SECOND LEVEL HIT

(71) Applicant: International Business Machines Corporation, Armonk, NY (US)

(72) Inventors: James Raymond Cuffney, Poughkeepsie, NY (US); Dominic Ditomaso, Hyde Park, NY (US); Brian Robert Prasky, Campbell Hall, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/654,060

(22) Filed: May 3, 2024

(65) Prior Publication Data
US 2025/0342037 A1   Nov. 6, 2025

(51) Int. Cl.
*G06F 9/30* (2018.01)
*G06F 9/38* (2018.01)

(52) U.S. Cl.
CPC ........ *G06F 9/3806* (2013.01); *G06F 9/30058* (2013.01)

(58) Field of Classification Search
CPC .. G06F 9/30058; G06F 9/3806; G06F 9/3844; G06F 9/3848
See application file for complete search history.

(56) References Cited

U.S. PATENT DOCUMENTS

| | | | |
|---|---|---|---|
| 10,534,611 B2 | 1/2020 | Bonanno et al. | |
| 11,556,474 B1 | 1/2023 | Bonanno et al. | |
| 11,782,919 B2 | 10/2023 | Collura et al. | |
| 11,868,779 B2 | 1/2024 | Cuffney et al. | |
| 2009/0210686 A1 | 8/2009 | Bonanno et al. | |
| 2011/0320792 A1* | 12/2011 | Bonanno | G06F 9/3806 712/240 |
| 2013/0339695 A1* | 12/2013 | Bonanno | G06F 9/3808 712/E9.045 |

(Continued)

OTHER PUBLICATIONS

Anonymous, "A Method and System for Improving Power Efficiency by Throttling branch Prediction Search Rate based on Queue Occupancy", IPCOM000237562D, IP.com, Jun. 24, 2014, 4 pages.

(Continued)

*Primary Examiner* — Jacob Petranek
(74) *Attorney, Agent, or Firm* — CANTOR COLBURN LLP; Edward Wixted

(57) ABSTRACT

A branch prediction logic system includes a branch history table (BHT), a multi-level history table, and a prediction update queue. The BHT includes a plurality of lines, each line corresponding to at least one branch instruction and containing history information specific to the at least one branch instruction. A first pattern history table (PHT-1) stores first branch data corresponding to the at least one branch instruction included in a given line of the BHT and a second pattern history table (PHT-2) stores second branch data corresponding to the at least one branch instruction included in a given line. The prediction update queue stores a line presence bit having one of a "1" logic state or a "0" logic state. The branch prediction logic system performs a data swap between the PHT-2 and the PHT-1 based on the logic state of the line presence bit.

15 Claims, 7 Drawing Sheets

(56) References Cited

U.S. PATENT DOCUMENTS

| | | | | |
|---|---|---|---|---|
| 2016/0026470 A1* | 1/2016 | Manoukian | ............ | G06F 9/3848 |
| | | | | 712/240 |
| 2020/0257534 A1* | 8/2020 | Bonanno | ............... | G06F 9/3806 |
| 2023/0053733 A1* | 2/2023 | Collura | ................ | G06F 9/3806 |
| 2023/0075992 A1* | 3/2023 | Cuffney | ................ | G06F 9/3806 |

OTHER PUBLICATIONS

Anonymous, "Correlating Lookahead Branch Prediction to Instruction Fetching in a High Frequency Superscalar Microprocessor", IPCOM000236655D, IP.com, May 7, 2014, 6 pages.

Anonymous, "Method to Exclude Bad Patterns From A Pattern History Table Branch Predictor", IPCOM000191968D, IP.com, Jan. 19, 2010, 5 pages.

Chowdhuryy, et al., Leaking Secrets through Modern Branch Predictors in the Speculative World, arXiv preprint, 2021, 14 pages.

Yeh, et al., A Comparison of Dynamic Branch Predictors that us Two Levels of Branch History, Department of Electrical Engineering and Computer Science, The University of Michigan, IEEE, 1993, pp. 257-266.

Yeh, et al., "Alternative Implementations of Two-Level Adaptive Branch Prediction", The 19th Annual International Symposium on Computer Architecture, 1992, 11 pages.

Zangeneh, et al., "BranchNet: A Convolutional Neural Network to Predict Hard-To-Predict Branches", 53rd Annual IEEE/ACM International Symposium on Microarchitecture (MICRO), 2020, 13 pages.

\* cited by examiner

MULTI-LEVEL PHT ENTRY SWAPS BASED ON FIRST LEVEL MISS AND SECOND LEVEL HIT

BACKGROUND

The present disclosure generally relates to data storage systems, and more specifically, to a metadata cache eviction computing process based on associated metadata presence.

Predicting the direction and target of branch instructions (often simply referred to as "branches") used in computer systems can be achieved using various types of prediction mechanisms. One of these prediction mechanisms is a pattern history table (PHT) where the direction of the prior branches leading up to a specific branch determine the guessed (i.e., predict) direction of the current branch. In this manner, the PHT can be useful mechanism for predicting the direction and target of branches that end a loop with a count.

Some branch prediction systems enhance the PHT mechanism by indexing the PHT using a global path vector (GPV). Rather recording the outcome of single executed branch, the GPV serves as a register that records the outcomes of recent branch instructions executed across the entire program to produce a global history. This global history can be represented as a bit vector, with each bit corresponding to the outcome of the branch instructions (e.g., taken or not taken). Accordingly, the value stored in the GPV is used to index the PHT and allows the branch prediction system to recognize and exploit patterns in branch behavior that are dependent on the broader execution context and make more accurate predictions.

SUMMARY

According to a non-limiting embodiment, a computing system including a branch prediction logic system is provided. The branch prediction logic system comprises a branch history table (BHT), a multi-level history table, and a prediction update queue. The BHT includes a plurality of lines, each line corresponding to at least one branch instruction and containing history information specific to the at least one branch instruction. The multi-level pattern history table stores branch data indexed to the at least one branch instruction. The multi-level pattern history table includes a first pattern history table (PHT-1) configured to store first branch data corresponding to the at least one branch instruction included in a given line of the BHT and a second pattern history table (PHT-2) configured to store second branch data corresponding to the at least one branch instruction included in a given line. The prediction update queue stores at least one PUQ entry corresponding to the at least one branch instruction, the PUQ entry including a line presence bit having one of a "1" logic state or a "0" logic state. The branch prediction logic system performs a data swap between the PHT-2 and the PHT-1 based on the logic state of the line presence bit According to another non-limiting embodiment, a computer implemented method comprises storing a plurality of lines in a branch history table (BHT), each line corresponding to at least one branch instruction and containing history information specific to the at least one branch instruction, storing, in a first pattern history table (PHT-1) of a multi-level pattern history table, first branch data corresponding to the at least one branch instruction included in a given line of the BHT, and storing, in a second pattern history table (PHT-2) of the multi-level pattern history table, second branch data corresponding to the at least one branch instruction included in a given line. The method further comprises storing, in a prediction update queue, at least one PUQ entry corresponding to the at least one branch instruction, the PUQ entry including a line presence bit having one of a "1" logic state or a "0" logic state, and performing a data swap between the PHT-2 and the PHT-1 based on the logic state of the line presence bit.

According to yet another non-limiting embodiment, a computer program product comprising a computer readable storage medium having program instructions embodied therewith, the program instructions executable by a processor to cause the processor to perform operations comprising storing a plurality of lines in a branch history table (BHT), each line corresponding to at least one branch instruction and containing history information specific to the at least one branch instruction, storing, in a first pattern history table (PHT-1) of a multi-level pattern history table, first branch data corresponding to the at least one branch instruction included in a given line of the BHT, and storing, in a second pattern history table (PHT-2) of the multi-level pattern history table, second branch data corresponding to the at least one branch instruction included in a given line. The method further comprises storing, in a prediction update queue, at least one PUQ entry corresponding to the at least one branch instruction, the PUQ entry including a line presence bit having one of a "1" logic state or a "0" logic state, and performing a data swap between the PHT-2 and the PHT-1 based on the logic state of the line presence bit.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
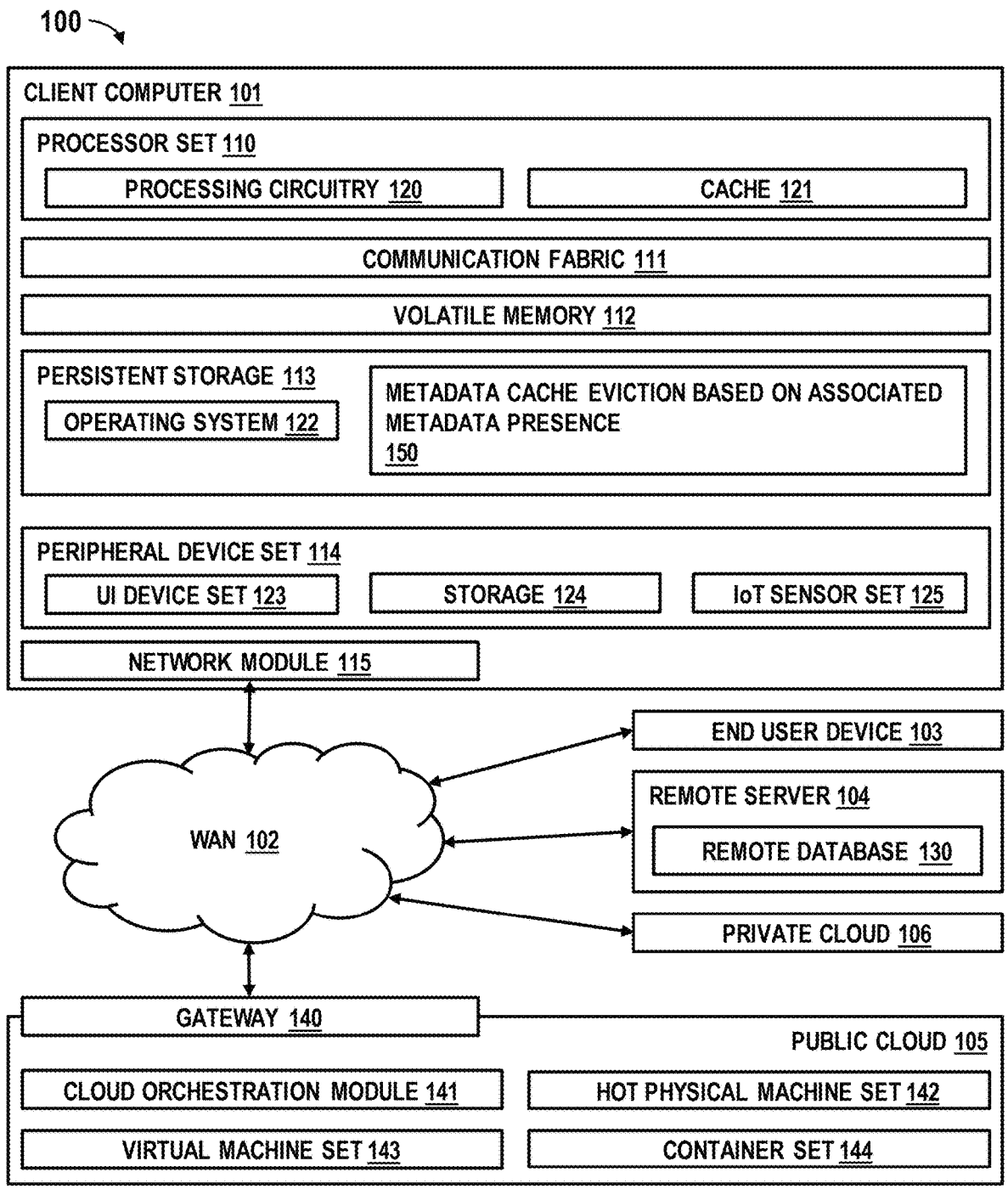
FIG. 1 is a block diagram of an example computer system for use in conjunction according to a non-limiting embodiment of the present disclosure.

In one or more non-limiting embodiments, methods, systems, and computer program products for metadata cache eviction based on associated metadata presence are provided. According to a non-limiting embodiment, a branch prediction logic system including multi-level PHT stages is provided. The branch prediction logic system decides whether the metadata that is being stored in a second-level cache, which takes additional latency to access, is more valuable than the metadata stored in the same indexed location in the first-level cache. Based on the decision, the branch prediction logic system determines whether a content swap operation should be performed, i.e., whether the data in the first-level cache should be evicted out to the second-level cache and the data in the second-level cache stored into the first-level cache.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as evicting metadata cache based on associated metadata presence by swapping data between first and second PHT cache levels, as shown at block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods, including metadata cache eviction based on associated metadata presence, may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods, including metadata cache eviction based on associated metadata presence. In this manner, the code included in block 150 can facilitate data eviction between a level 1 (PHT-1) and a level 2 (PHT-2) at completion time.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
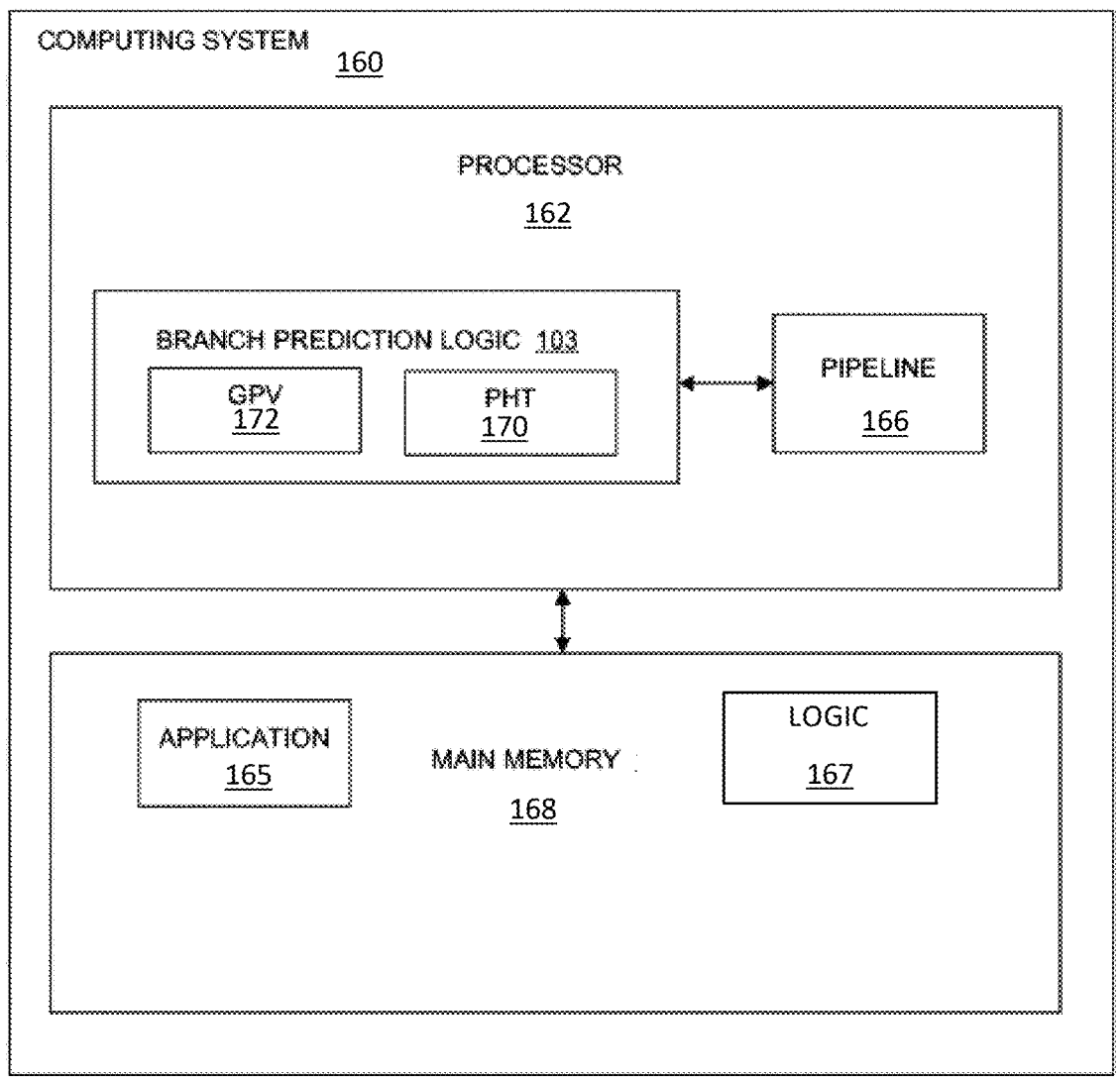
FIG. 2 depicts a computing system that implements a branch prediction logic system according to a non-limiting embodiment of the present disclosure.

Referring now to FIG. 2, an embodiment of a computer system 160 is generally shown. Computer system 160 includes a processor 162 that is in communication with a main memory 164. The processor 162 executes applications 165 and logic 167 as branch prediction logic, which are stored in main memory 164 by processing instructions using pipeline 166. Pipeline 166 fetches, decodes, and completes instructions. During the execution of such applications, branch instructions (also referred to as "branches") may be encountered. Branch prediction logic 167 is used to predict the direction (i.e., taken or not taken) of branch instructions at prediction time, which is before completion time and allows fetching and decoding to continue in the predicted direction of the branch. The branch prediction logic 167 is updated at completion time, when the direction and target address of the branch is known. Branch prediction logic 167 communicates with a multi-level PHT cache 170, which is indexed using a global pattern value (GPV) 172. The GPV 172 can provide GPV bits that represent a global pattern value maintained by the branch prediction logic system 200. The GPV 172 can be updated based on the outcomes of previous branches, and the GPV bits used to index the multi-level PHT cache 170 as described in greater detail below.

Figure 3:
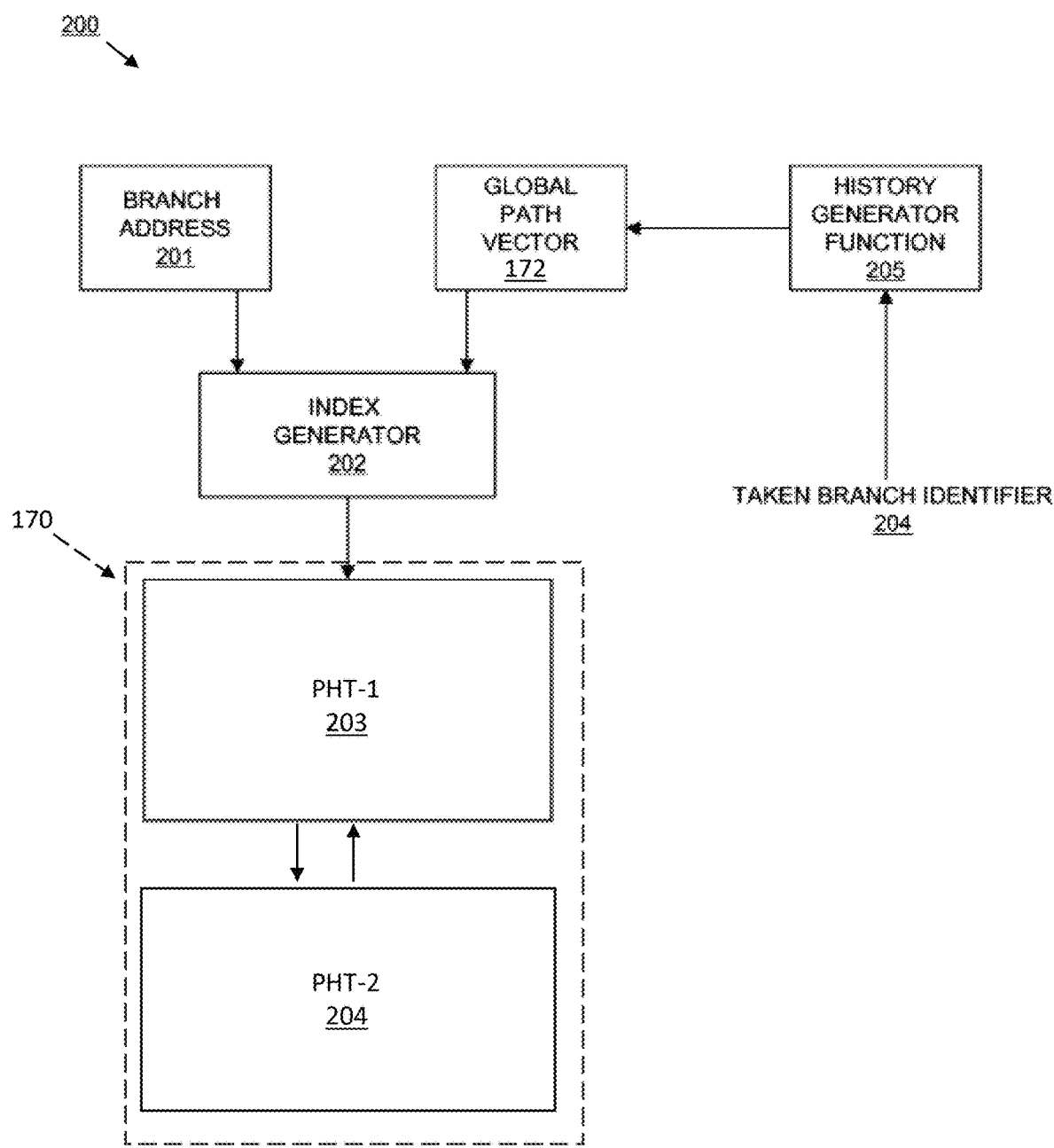
FIG. 3 depicts a branch prediction logic system including multi-level PHT stages according to a non-limiting embodiment of the present disclosure.

FIG. 3 illustrates an embodiment of a branch prediction logic system 200, which includes a history generator function 205, a the GPV 172, an index generator 202, the multi-level PHT cache 170, and the branch prediction logic 167 of FIG. 2. The history generator function 205 reduces the number of bits in the taken branch identifier. The reduced number of bits may be smaller than the number of bits in the GPV 172. The output of the history generator function 205 is then shifted into the GPV 172, where older bits in the GPV 172 will be shifted out as new bits are shifted in. The branch address 201 of the taken branch and the contents of the GPV 172 are input into index generator 202, which generates GPV bits that are used as an index for the PHT-1 203. The index generator 202 may generate the index for the PHT-1 203 either at branch prediction time for reading to the PHT-1 203 or at update time for writing the PHT-1 203. The index generator 202 may be any function that combines bits from the GPV 172 with the branch address 201, and may not use all of the bits of the branch address 201 or of the GPV 172 in some embodiments.

The instruction address of each taken branch goes through the history generator function 205 before being shifted into the GPV 172. In some embodiments, the history generator function 205 may be a hash function, such as exclusive OR (XOR) logic, to reduce the number of bits in the instruction address. For example, a 64-bit instruction address may be hashed down to 2 bits using a history generator function 205 comprising two 32-way XOR functions. The result of the history generator function 205 is shifted into the GPV 172. Multiple speculative copies of the GPV 172 may be maintained in the branch prediction logic 167 in some embodiments, each for use at a particular time, for example, at prediction time, at completion time, and for branches within the pipeline to allow restoration when there is an incorrect prediction.

The multi-level PHT cache 170 includes a first-level PHT (PHT-1) 203 and a second-level PHT (PHT-2). In general, the PHT-1 203 and the PHT-2 204 each store a static random short length of branch history for table indexing and records the outcome of a given branch based on the pattern to get to the given branch. In some instances, the indexed branch data (e.g., the branch) stored in the PHT-2 204 may be the same as the indexed branch data stored in the PHT-1 203, while in other instances the branch data stored in the PHT-2 204 may be different from the indexed branch data stored in the PHT-1 203.

The PHT-1 203 serves as a first-level cache and is indexed by a GPV 172 (which may correspond to GPV 172 of FIG. 2). When a taken branch is encountered in the pipeline 166 during execution of an application, an identifier of the taken branch, which may include, for example, the instruction address or the target address of the taken branch, is input to a history generator function 205. According to a non-limiting embodiment, the PHT-1 203 can serve as an auxiliary branch predictor that is used to predict branch direction for branches that correlate with a particular history, which is tracked through a respective GPV 172 of prior branch direction predictions. For example, a loop of size "n" will follow a predictable pattern of behavior based on the value of "n". Based on the size of "n" different history lengths are more accurate at being able to predict the direction of the current branch.

The PHT-2 204 serves as a second-level cache and provides data slower (i.e., with longer delay time or latency) compared to the PHT-1 203. Implementing the PHT-2 204 facilitates an increase in the number of branches in a line because it can be utilized as a direction predictor. Although the PHT-2 204 does add latency to the prediction pipeline because the physical distance travelled is greater as well as the greater number of predictors factoring into the overall prediction increases the amount of combinatorial logic to resolve the prediction decision tree. This is a tradeoff to provide more branches that benefit from a PHT auxiliary predictor produced by the increased latency caused using the PHT-2 204. Accordingly, the PHT-1 203 can be utilized to quickly provide initial predictions based on local or recent history, while the PHT-2 204 can provide additional capacity to make predictions utilizing the unique PHT indexing algorithm described herein.

According to a non-limiting embodiment, a branch prediction logic system 200 utilizes an algorithm that determines how to decide whether to swap data in the PHT-2 204 with data in the PHT-1 203 to reduce latency. In other words, the algorithm facilitates the indexing of PHT predictors on a line basis. As a result, multiple predictions in a single line are factored into the swap decision for a single PHT entry. Rather than only updating one branch at a time when using branch prediction update algorithms as is the conventional operation, the branch prediction logic system 200 adds a line presence (LP) bit to the update decision in order to track the PHT-1 203 versus the PHT-2 204 usage across a line when updating a single branch. According to a non-limiting embodiment, the LP bit is set when the PHT-2 hits against any branch in the line and the PHT-1 does not hit against any branches in the line.

Figure 4:
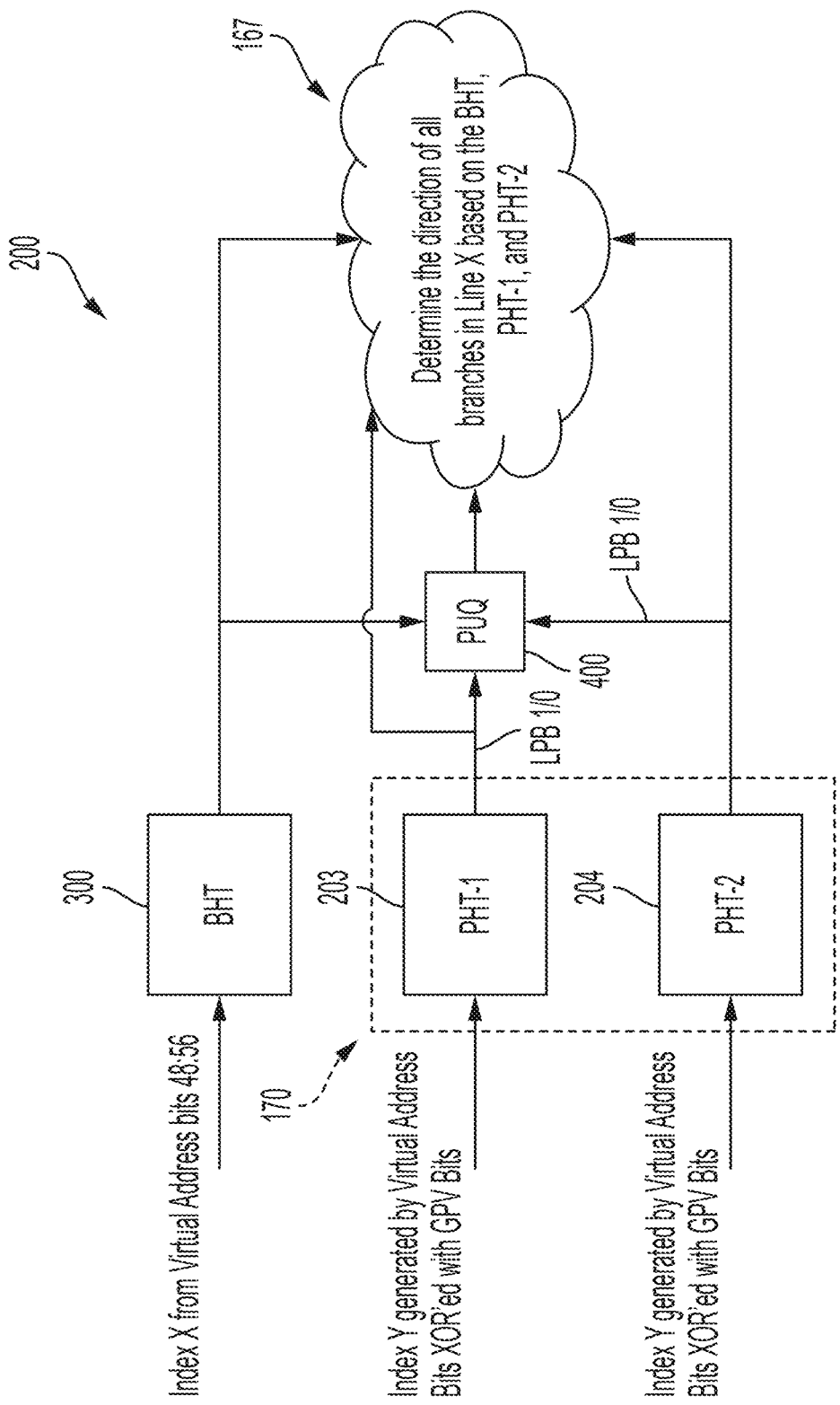
FIG. 4 is a block diagram of the branch prediction sources that establish branch prediction in a multi-level PHT stages according to a non-limiting embodiment of the present disclosure.

Turning now to FIG. 4, branch prediction sources that establish branch prediction in multi-level PHT stages of a branch prediction logic system 200 are illustrated according to a non-limiting embodiment of the present disclosure. The branch prediction sources include a branch history table (BHT) 300, the PHT-1 203, the PHT-2 204, and one or more prediction update queues (PUQs) 400.

According to a non-limiting embodiment, the cache structure in question (i.e., the data storage of the PHT-1 203 and the PHT-2 204) is exclusive, and the metadata in question is information to predict the direction, either taken or not taken, of a particular branch. Since this metadata is speculative prediction information, the metadata does not require that all data be present during the branch prediction algorithm. However, making an incorrect prediction will cause restarts of the overall core execution pipeline and so the accuracy of the branch prediction algorithm has an impact on the overall performance of the core execution pipeline.

Figure 5:
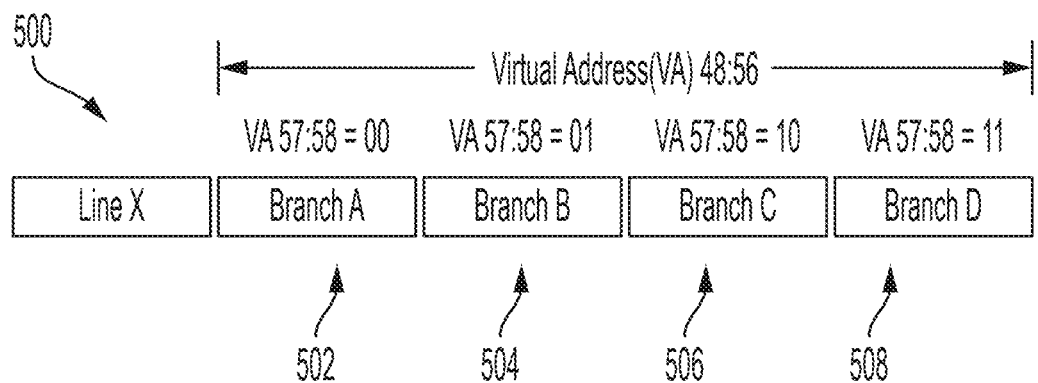
FIG. 5 depicts a line-based indexing of branch data in the branch prediction sources according to a non-limiting embodiment of the present disclosure.

According to non-limiting embodiment, the cache structure in question (i.e., the data storage of the PHT-1 203 and the PHT-2 204) pertains to branches that do not exhibit consistent behavior and therefore require a specialized cache to predict their direction more accurately. This basic predictive structure employed by the prediction logic system 200 is referred to as the branch history table (BHT) 300. The BHT 300 is defined by one or more indices that each correspond to data for a given line and contains information on all branches in the given line. The address space of a given BHT line is indexed by a 63-bit virtual address 0:62. The index line 500 (also referred to herein simply as an "index") for the BHT 300 is bits 48 to 56 (48:56) of the virtual address (see FIG. 5). As described herein, a "line" refers to a 128-byte section indexed by bits 48:56 of the BHT virtual address plus all combination of bits 56:62 of the virtual address. Accordingly, the branch prediction logic system 200 (e.g., processor 162) utilizes bits 48:56 to look up a corresponding entry in the BHT 300, which contains the branch history information for one or more branches, e.g., Branch A 502, Branch B 504, Branch C 506, and Branch D 508.

Figure 6:
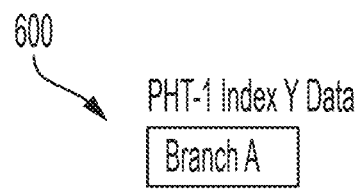
FIG. 6 is a data structure for a first-level PHT.
Figure 7:
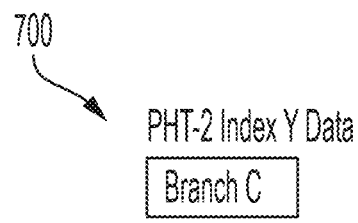
FIG. 7 is a data structure for a second-level PHT.

As described herein, the PHT-1 203 stores a single branch entry (Branch A) that is mapped to index data "Y" generated as a portion of the Virtual Address (e.g., 57:58) XOR'ed with a GPV bits (see FIG. 6), while the PHT-2 204 stores a single branch entry (Branch C) that is mapped to index data "Y" generated as a portion of the Virtual Address (e.g., 57:58) XOR'ed with a GPV bits (see FIG. 7). The PHT-1 203 serves as a specialized first-level cache structure, which can be accessed at the same time as the BHT 300 with no additional latency. The PHT-2 204 is a specialized second-level cache structure, which takes additional latency to use in generating direction predictions in relation to the BHT 300. The PHT-1 203 and PHT-2 204 each generate their indices by factoring in the current line address combined with bits that indicate the path through prior branches, whether those branches were taken or not taken giving a form of history provided by the GPV 172 (see FIG. 3). According to a non-limiting embodiment, given a particular history and line address, the PHT-1 203 and PHT-2 204 will generate the same index.

With continued reference to FIG. 4, the PHT-1 203 and the PHT-2 204 can be designed as arrays of the same size such that their indices 600, 700, respectively, will map 1:1 to each other. The reason that the PHT-2 204 takes additional latency to use a prediction from is the combinatorial logic needed to generate a prediction combining so many different sources (e.g., BHT 300, PHT-1 203, and PHT-2 204) cannot fit in a single cycle at the core frequency once the PHT-2 204 is integrated and so must take additional cycles if the PHT-2 204 is involved in the prediction.

According to a non-limiting embodiment, the PHT-1 203 and the PHT-2 204 are indexed using the BHT line X 500. The BHT line X 500 contains multiple unique branch instructions A 502, B 504, C 506, and D 508 (collectively referred to as branches 502-508), each having metadata pertinent to their individual branch in the BHT 300. In a non-limiting embodiment, the branches 502-508 are all evenly split across the entire index range (e.g., 48:56), but they can be anywhere inside the line 500. This metadata is comprised of the branch direction (taken or not taken), the target address, the branch type, and other identifying characteristics.

The PHT-1 203 stores branch data 600 for a single branch. In the example shown in FIG. 6, the PHT-1 203 stores branch metadata 600 pertaining to the direction of Branch A 502, but it should be appreciated that metadata associated with a different branch (e.g., 504, 506 or 508) can be stored. Similarly, the PHT-2 stores branch data 700 for a single branch. In the example shown in FIG. 7, the PHT-2 204 stores branch metadata 700 pertaining to the direction of Branch C 506, but it should be appreciated that metadata associated with a different branch (e.g., branches 502, 504, or 508) can be stored. The PHT-1 203 and PHT-2 204 are indexed by a combo of the virtual address bits used to index the BHT 300 as well as bits that form a history of predictions that occurred to travel the code to this point. While both the PHT-1 203 and PHT-2 204 have the same index as each other the data inside the arrays are different. In this manner, the PHT-1 203 can have metadata information for Branch A 502 and the PHT-2 204 can have metadata for Branch C 506. Accordingly, the PHT-1 203 and the PHT-2 204 can be accessed at the same time and return unique data.

When making a prediction for a branch the more specialized cache data takes priority when determining the direction. In addition, when the prediction information is reported to the other core units that act as consumers of the data the branch prediction algorithm reports data for all branches in a line at the same time. However, a latency penalty may be incurred when accessing the PHT-2 204 to determine the correct direction of a branch since all branches 502-508 in a line 500 report their prediction information at the same time. This latency penalty is preferable to getting the direction of the branch wrong when it is executed as part of the core execution pipeline 166.

As the code being executed by the core execution pipeline 166 reaches completion, the metadata in the predictive structures needs to be updated. These updates are to reflect changes in the behavior of the branch in how it executed compared to how it was predicted to execute. For example, a branch that was predicted taken and resolved during execution as not taken should have the entry in the associated tables updated so that the next time it is predicted it will have the new correct direction prediction of not taken. This update behavior is done on a single branch at a time after the branch instruction completes execution of the branch.

The branch prediction logic system 200 solves the problem described above by determining how to handle data eviction between the PHT-1 203 and PHT-2 204 at completion time where the data for the update to either the BHT 300, the PHT-1 203, or PHT-2 204 is present is for only a single branch 502, 504, 506, 508 in the line 500. When Branch A 502 completes, for example, the branch prediction logic 167 will obtain data for that branch 502 from the BHT 300 and the PHT-1 203 and will perform the updates for that branch 502 in those locations where appropriate. When the branch associated with the PHT-2 204 completes e.g., Branch C 506, the branch prediction logic 550 will obtain data for that branch 506 from the BHT 300 and the PHT-2 204 and will perform the updates for that branch 506 in those locations where appropriate. Since Branch C 506 has data in the PHT-2 204, the branch prediction logic system 200 implements a novel prediction mechanism referred to herein as a "line presence bit" (LPB) to determine whether to transfer the data in the PHT-2 204 into the PHT-1 203 in order to avoid the latency penalty for Branch C 504 to establish a correct direction prediction the next time that Line X 500 is predicted.

The branch prediction logic system 200 utilizes the line presence bit at update time, i.e., after the branch completes execution, to determine whether a transfer between the PHT-1 203 and PHT-2 204 is necessary. The line presence bit solves the problem that would otherwise occur at update during which time the PHT-1 203 and the PHT-2 204 are only presented information pertaining to the branch being updated. Other branch data in the line 500 is not present for the branch prediction logic system 200 to make decisions on transfers between the PHT-1 203 and the PHT-2 204. Accordingly, the line presence bit is passed from prediction time, when data is present for all branches in the same index, to completion time where the update occurs.

According to a non-limiting embodiment, the branch prediction logic system 200 utilizes the PUQ 400 to store additional information such as line presence, for example, which indicates the way a branch was predicted during the prediction pipeline 166. The PUQ 400 can also be written to as part of the prediction pipeline 166 with information about predicted branches that will allow the branch prediction logic 550 to determine whether an update is necessary for a completing branch. According to a non-limiting embodiment, the PUQ 400 can include a line presence register, which can be written to with a line presence bit (e.g., a logic state of either "1" or a "0"). Accordingly, the PUQ 400 can be read at completion and when a match is found, the data stored in the PUQ 400 (e.g., the LPB set to either a "1" or "0" stored in the line presence register) can be obtained by the branch prediction logic 550 to indicate the completion of the branch, e.g., data indicating a wrong target or direction. In this manner, the branch prediction logic 550 can make a complete decision about the need for updates or transfers between the PHT-1 203 and the PHT-2 204.

According to a non-limiting embodiment, whenever a branch operation determines it may need to update the PHTs at the end of execution, it writes to the PUQ 400 and sets the line presence bit. However, not every branch operation is required to write to the PUQ 400, only those anticipated to require a PHT update upon completion. This approach provides additional data to help decide whether and how to update the PHTs 203 and 204 after the branch completes its execution. According to a non-limiting embodiment, PHT branches can write to the PUQ according to two conditions: 1) when there is a need to update a branch's state (e.g., predicted direction) (e.g., true for both PHT-1 and PHT-2 predicted branches; and/or 2) there is a need to swap the PHT-1 and PHT-2 entries (e.g. the line presence bit is set=1). This additional criterion for writing to the PUQ 400 ensures that, at the completion stage, if a decision is made to update the prediction, the presence of a corresponding PUQ entry (e.g., the setting of the line presence bit) signals the need for an update, which then can result in a data swap between the PHT-2 204 and the PHT-1 203.

Table 1 below depicts various examples of how the branch prediction logic 550 determines whether or not to perform a data swap between the PHT-2 204 and PHT-1 203.

TABLE 1

| PHT-1 Data Present for Branch A in Line X | PHT-2 Data Present for Branch A in Line X | PHT-1 Data Present for Branch C in Line X | PHT-2 Data Present for Branch C in Line X | Line Presence Bit Set in PUQ | Transfer for Branch A | Transfer for Branch C |
|---|---|---|---|---|---|---|
| 0 | 0 | 0 | 0 | 1 | 0 | 0 |
| 0 | 0 | 0 | 1 | 1 | 0 | 1 |
| 0 | 0 | 1 | 0 | 0 | 0 | 0 |
| 0 | 0 | 1 | 1 | 0 | 0 | 0 |
| 0 | 1 | 0 | 0 | 1 | 1 | 0 |
| 0 | 1 | 1 | 0 | 0 | 0 | 0 |
| 1 | 0 | 0 | 0 | 0 | 0 | 0 |
| 1 | 0 | 0 | 1 | 0 | 0 | 0 |
| 1 | 1 | 0 | 0 | 0 | 0 | 0 |

Referring to Table 1, for example, the branch prediction logic 550 will determine that a branch shall transfer data from the PHT-2 204 to the PHT-1 203 when there is data present in the PHT-2 204 and the line present bit in the PUQ 400 is set to "1" for the corresponding line 500 (see row 2 of the Table 1). Accordingly, the branch prediction logic 550 determines that there is no other branch in the same line 500 that is using the PHT-1 203. By utilizing the line presence bit, the branch prediction logic system 200 can reduce the number of necessary update pipeline passes for lines that use both the PHT-1 203 and PHT-2 204. This reduction is achieved by avoiding forced updates for false positives where the branch in the PHT-2 204 (e.g., Branch C 506) is not being factored into the decision for the branch in the PHT-1 203 (e.g., Branch A 502).

According to a non-limiting embodiment where the branch prediction logic system 200 implements "N" levels of PHT arrays, for example, the line presence bit could be extrapolated to be used in a similar way. If there was no other PHT used in a line other than PHT-N, where N>1, then the line presence bit would be set to "1" and a transfer would initiate from the PHT-N that hit to the first-level PHT-1 during the update pipeline pass. Accordingly, a reduction in overall computing power usage is achieved due by avoiding the need to access and write the arrays. In addition, the branch prediction logic system 200 provides a performance benefit by avoiding unnecessary updates, which prevents impeding important updates for branches that complete after them.

As described herein the branch prediction logic system 200 establishes a unique relationship between the BHT 300, PHT-1 203, PHT-2 204, and the PUQ 400 that is not provided in traditional tier-2 cache structures. The branch prediction logic system 200 also facilitates the ability for the BHT 300 to access metadata pertaining to multiple branches with a single index, whereas the PHT-1 203 and PHT-2 204 access metadata for a single branch of the array for the same index. In addition, because it is not intrinsically obvious that information about a separate branch is needed to decide about the transfer from a level-2 cache to a level-1 cache, the line presence bit implemented by the branch prediction logic system 200 reduces unnecessary updates to the PHT-1 203 and PHT-2 204, thereby reducing computing power usage while improving performance. For example, the branch prediction logic system 200 has achieved a 0.25% performance increase on workloads with the PHT-2 function fully enabled when performing a data swap (e.g., between the PHT-2 204 and the PHT-1 203) using the line presence bit prediction mechanism.

Figure 8:
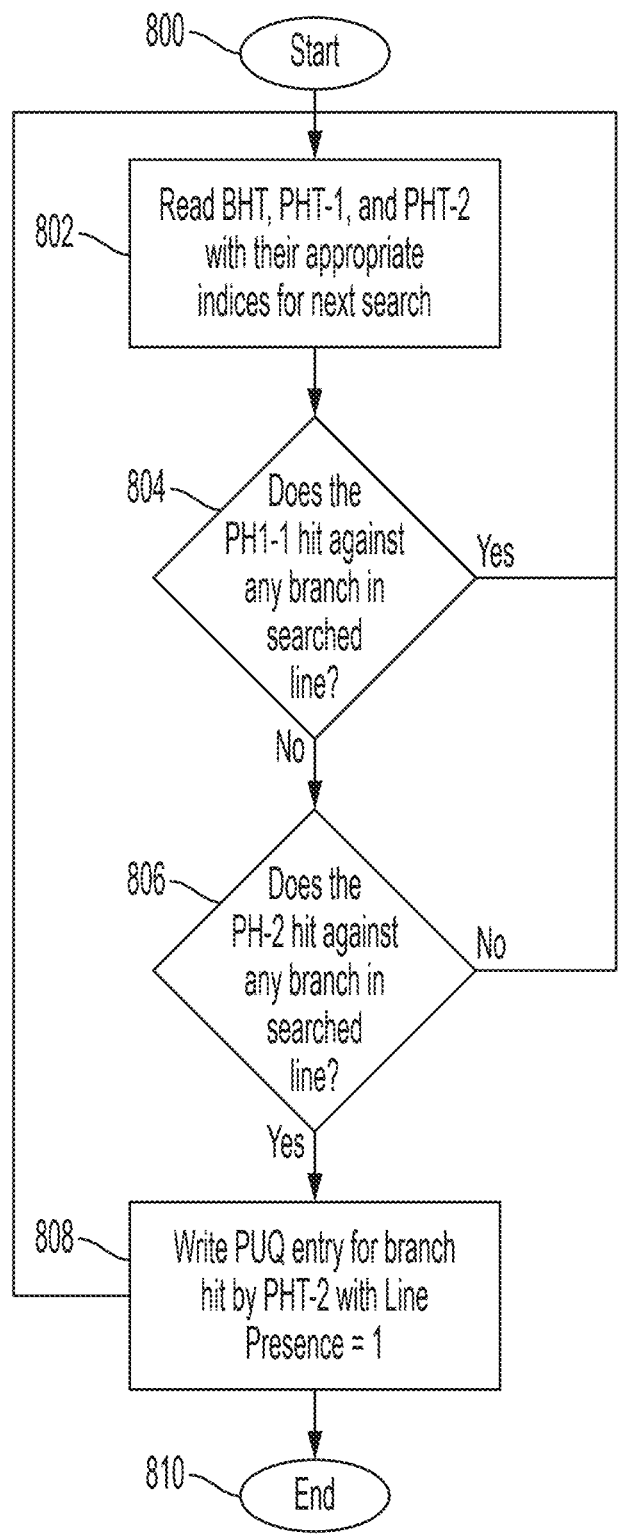
FIG. 8 is a flow diagram illustrating a method of performing a line presence bit write to a prediction update queue (PUQ) included in the branch prediction logic system according to a non-limiting embodiment of the present disclosure.

Turning now to FIG. 8, a method of performing a line presence bit write to a PUQ included in the branch prediction logic system 200 is illustrated according to a non-limiting embodiment of the present disclosure. The method begins at operation 800, and at operation 802 the branch prediction logic system 200 reads the BHT 300, the PHT-1 203 and the PHT-2 204 with their appropriate indices for the next search. At operation 804 the branch prediction logic system 200 determines whether the PHT-1 hits against any branch searched in the line 500. When there is a hit against any branch searched, the method returns to operation 802 and continues reading the BHT 300, the PHT-1 203 and the PHT-2 204 with their appropriate indices for the next search.

When the PHT-1 203 does not a hit against any branch searched, the branch prediction logic system 200 determines whether the PHT-2 204 hits against any branch in the searched line 500. When the PHT-2 204 does not hit against any branch searched, the method returns to operation 802 and continues reading the BHT 300, the PHT-1 203 and the PHT-2 204 with their appropriate indices for the next search. However, when the PHT-2 204 hits against any branch searched, the branch prediction logic system 200 writes to the PUQ 400 and sets the line presence bit to "1" for the branch hit by the PHT-2 204, and the method ends at operation 810.

Figure 9:
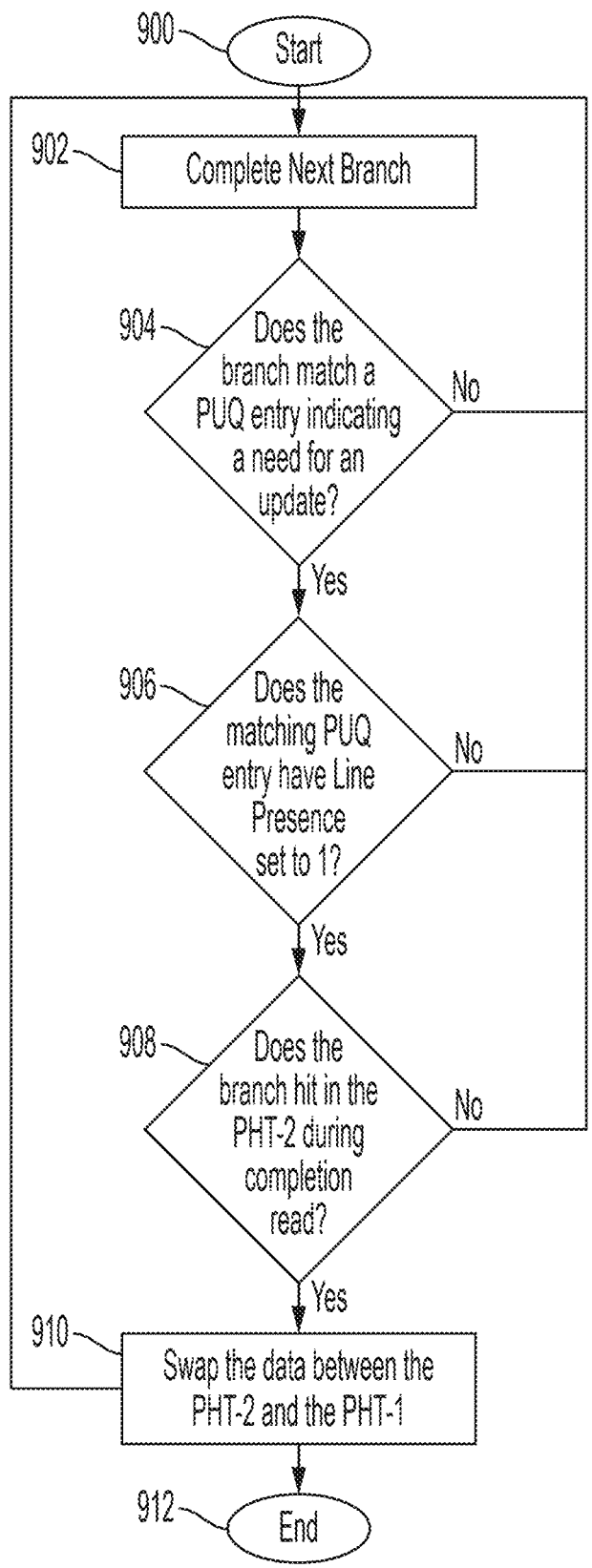
FIG. 9 illustrates a method of performing a completion time data swap between a first-level PHT and a second-level PHT included in a branch prediction logic system according to a non-limiting embodiment of the present disclosure.

Referring to FIG. 9, a method of performing a completion time data swap between the PHT-1 203 and the PHT-2 204 included in the branch prediction logic system 200 is illustrated according to a non-limiting embodiment of the present disclosure. The method begins at operation 900 and the system completes the next branch at operation 902. At operation 904, a determination is made as to whether the branch matches a PUQ entry indicating a need for an update. If not, the method returns to operation 902 and completes the next branch. When, however, the branch matches the PUQ entry, the method proceeds to operation 906 and determines whether the matching PUQ entry has a line presence bit set to "1". If not (i.e., the line presence bit is set to "0"), the method returns to operation 902 and completes the next branch. When, however, the matching PUQ entry has a line presence bit set to "1", the method proceeds to operation 908 and determines whether the branch hit in the PHT-2 during completion. If not, the method returns to operation 902 and completes the next branch. When, however, the branch hit in the PHT-2, the method proceeds to operation 910 and swaps data between the PHT-2 and the PHT-1, and the method ends at operation 912

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computing system including a branch prediction logic system comprising:
   a branch history table (BHT) including a plurality of lines, each line corresponding to at least one branch instruction and containing history information specific to the at least one branch instruction;
   a multi-level pattern history table configured to store branch data indexed to the at least one branch instruction, the multi-level pattern history table including a first pattern history table (PHT-1) configured to store first branch data corresponding to the at least one branch instruction included in a given line of the BHT and a second pattern history table (PHT-2) configured to store second branch data corresponding to the at least one branch instruction included in a given line; and a prediction update queue (PUQ) configured to store at least one PUQ entry corresponding to the at least one branch instruction, the PUQ entry including a line presence bit having one of a "1" logic state or a "0" logic state, wherein the branch prediction logic system is configured to perform a data swap between the PHT-2 and the PHT-1 based on the logic state of the line presence bit, the data swap including replacing, at the same index, the first branch data stored in the PHT-1 with the second branch data, and replacing, at the same index, the second branch data stored in the PHT-2 with the first branch data.

2. The computing system of claim 1, wherein a combination of the first branch data and the history information provides first result data when the at least one branch instruction corresponding to the first branch data completes, and wherein a combination of the second branch data and the history information provides second result data when the at least one branch instruction corresponding to the second branch data completes.

3. The computing system of claim 2, wherein the branch prediction logic system updates the PHT-1 and the BHT based on the first result data, and updates the PHT-2 and the BHT based on the second result data.

4. The computing system of claim 3, wherein the branch prediction logic system performs the data swap when a completed branch from the line matches a PUQ entry indicating a need to update, the matching PUQ entry includes the line presence bit set to the "1" logic state, and the completed branch indexes to the second branch data in the PHT-2.

5. The computing system of claim 4, wherein the branch prediction logic system maintains the first branch data in the PHT-1 and the second branch data in the PHT-2 when the matching PUQ entry includes the line presence bit set to the "0" logic state.

6. A computer implemented method comprising:
storing a plurality of lines in a branch history table (BHT), each line corresponding to at least one branch instruction and containing history information specific to the at least one branch instruction;
storing, in a first pattern history table (PHT-1) of a multi-level pattern history table, first branch data corresponding to the at least one branch instruction included in a given line of the BHT;
storing, in a second pattern history table (PHT-2) of the multi-level pattern history table, second branch data corresponding to the at least one branch instruction included in a given line;
storing, in a prediction update queue, at least one PUQ entry corresponding to the at least one branch instruction, the PUQ entry including a line presence bit having one of a "1" logic state or a "0" logic state; and
performing a data swap between the PHT-2 and the PHT-1 based on the logic state of the line presence bit, the data swap including replacing, at the same index, the first branch data stored in the PHT-1 with the second branch data, and replacing, at the same index, the second branch data stored in the PHT-2 with the first branch data.

7. The computer implemented method of claim 6, further comprising:

providing first result data based on a combination of the first branch data and the history information in response to completion of the at least one branch instruction corresponding to the first branch data; and
providing second result data based on a combination of the second branch data and the history information in response to completion of the at least one branch instruction corresponding to the second branch data.

8. The computer implemented method of claim 7, further comprising:
updating the PHT-1 and the BHT based on the first result data; and
updating the PHT-2 and the BHT based on the second result data.

9. The computer implemented method of claim 8, further comprising:
performing the data swap in response to:
a completed branch from the line corresponds to a matching PUQ entry indicating a need to update;
the matching PUQ entry including the line presence bit set to the "1" logic state; and
the completed branch indexes to the second branch data in the PHT-2.

10. The computer implemented method of claim 9, further comprising:
maintaining the first branch data in the PHT-1 and the second branch data in the PHT-2 when the matching PUQ entry includes the line presence bit set to the "0" logic state.

11. A computer program product comprising a computer readable storage medium having program instructions embodied therewith, the program instructions executable by a processor to cause the processor to perform operations comprising:
storing a plurality of lines in a branch history table (BHT), each line corresponding to at least one branch instruction and containing history information specific to the at least one branch instruction;
storing, in a first pattern history table (PHT-1) of a multi-level pattern history table, first branch data corresponding to the at least one branch instruction included in a given line of the BHT;
storing, in a second pattern history table (PHT-2) of the multi-level pattern history table, second branch data corresponding to the at least one branch instruction included in a given line;
storing, in a prediction update queue, at least one PUQ entry corresponding to the at least one branch instruction, the PUQ entry including a line presence bit having one of a "1" logic state or a "0" logic state; and
performing a data swap between the PHT-2 and the PHT-1 based on the logic state of the line presence bit, the data swap including replacing, at the same index, the first branch data stored in the PHT-1 with the second branch data, and replacing, at the same index, the second branch data stored in the PHT-2 with the first branch data.

12. The computer program product of claim 11, further comprising:
providing first result data based on a combination of the first branch data and the history information in response to completion of the at least one branch instruction corresponding to the first branch data; and
providing second result data based on a combination of the second branch data and the history information in response to completion of the at least one branch instruction corresponding to the second branch data.

13. The computer program product of claim 12, further comprising:
   updating the PHT-1 and the BHT based on the first result data; and
   updating the PHT-2 and the BHT based on the second result data.

14. The computer program product of claim 13, further comprising:
   performing the data swap in response to:
      a completed branch from the line corresponds to a matching PUQ entry indicating a need to update;
      the matching PUQ entry including the line presence bit set to the "1" logic state;
      the completed branch indexes to the second branch data in the PHT-2.

15. The computer program product of claim 14, further comprising:
   maintaining the first branch data in the PHT-1 and the second branch data in the PHT-2 when the matching PUQ entry includes the line presence bit set to the "0" logic state.

\* \* \* \* \*